United States Patent
Schoch et al.

(10) Patent No.: US 6,740,351 B2
(45) Date of Patent: May 25, 2004

(54) METHOD FOR PRODUCTION OF A REGULAR MULTI-LAYER CONSTRUCTION, IN PARTICULAR FOR ELECTRICAL DOUBLE LAYER CAPACITORS AND THE CORRESPONDING DEVICE

(75) Inventors: Klaus Schoch, Nattheim (DE); Werner Erhardt, Ballendorf (DE); Hartmut Michel, Heidenheim (DE)

(73) Assignee: Epcos AG, Münich (DE)

( * ) Notice: Subject to any disclaimer, the term of this patent is extended or adjusted under 35 U.S.C. 154(b) by 0 days.

(21) Appl. No.: 10/168,465

(22) PCT Filed: Dec. 4, 2000

(86) PCT No.: PCT/DE00/04315

§ 371 (c)(1),
(2), (4) Date: Jun. 20, 2002

(87) PCT Pub. No.: WO01/46973

PCT Pub. Date: Jun. 28, 2001

(65) Prior Publication Data

US 2003/0003685 A1 Jan. 2, 2003

(30) Foreign Application Priority Data

Dec. 21, 1999 (DE) .......................... 199 61 840

(51) Int. Cl.$^7$ .......................... B05D 5/12; H01G 7/00; B05C 11/00
(52) U.S. Cl. .......................... 427/79; 427/80; 427/81; 29/25.03; 29/25.41; 29/25.42; 118/37; 118/106; 118/123; 118/235
(58) Field of Search .......................... 427/79, 80, 81; 29/25.03, 25.42, 25.41; 118/37, 106, 123, 235

(56) References Cited

U.S. PATENT DOCUMENTS

| | | | | |
|---|---|---|---|---|
| 3,616,039 A | * | 10/1971 | Hutzler et al. | 156/254 |
| 4,531,281 A | * | 7/1985 | Murray et al. | 29/25.03 |
| 4,603,467 A | * | 8/1986 | Kaneko | 29/25.03 |
| 5,172,461 A | * | 12/1992 | Pichl | 29/25.42 |
| 5,621,607 A | | 4/1997 | Farahmandi et al. | |
| 5,922,168 A | * | 7/1999 | Zablotny et al. | 156/379 |
| 5,922,215 A | * | 7/1999 | Pless et al. | 216/6 |
| 5,930,108 A | | 7/1999 | Kurzweil et al. | |

FOREIGN PATENT DOCUMENTS

| | | |
|---|---|---|
| DE | 197 04 584 C2 | 8/1998 |
| EP | 0 917 166 A2 | 5/1999 |

OTHER PUBLICATIONS

Japanese Abstract, 11260673 A, Publication Date Sep. 24, 1999.

* cited by examiner

Primary Examiner—Brian K. Talbot
(74) Attorney, Agent, or Firm—Schiff Hardin LLP

(57) ABSTRACT

For manufacturing a multi-layer structure with repeating layer sequences, a band-shaped carrier material is first partially separated into individual sections of a same size with connections capable of bearing remaining between the individual sections. After continuously applying at least one further material layer on the surface of the carrier material, the individual sections are completely separated by cutting or punching. The multi-layer structure is obtained by stacking the individual sections obtained in this way on top of one another, whereby intermediate layers can also be potentially inserted between two individual sections.

12 Claims, 2 Drawing Sheets

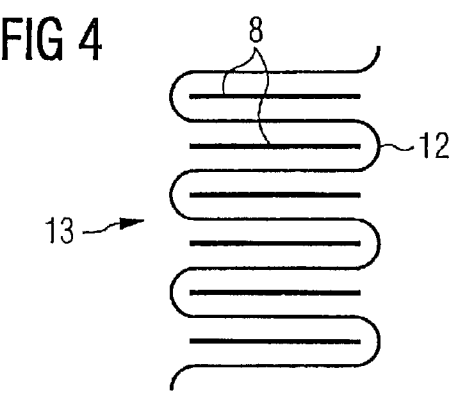
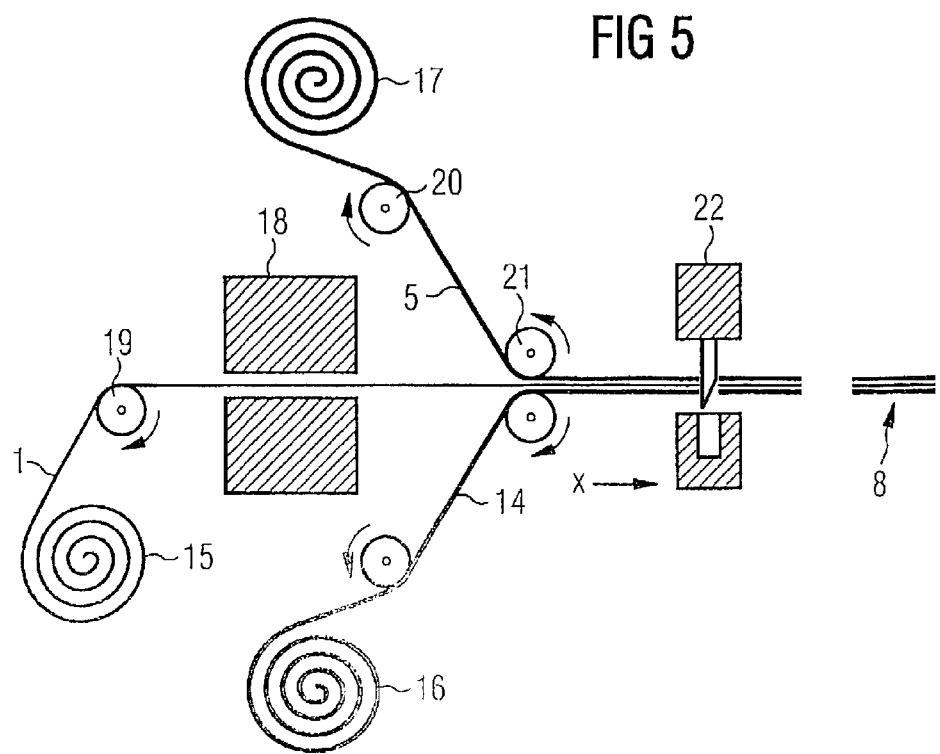

METHOD FOR PRODUCTION OF A REGULAR MULTI-LAYER CONSTRUCTION, IN PARTICULAR FOR ELECTRICAL DOUBLE LAYER CAPACITORS AND THE CORRESPONDING DEVICE

The present invention related generally to a method and apparatus for forming a multi-layer structure for the assembly into a capacitor, for example. Multi-layer structures are particularly known in electrical components in order, generally, to increase the power of electrical single-layer components by providing multiple arrangements above one another.

U.S. Pat. No. 5,621,607 discloses capacitors with a multi-layer structure that, for example, are composed of a plurality of electrode layers between which a dielectric is respectively arranged. The capacitor with multi-layer structure thereby comprises a multiple of the capacitance that attaches to an individual capacitor element composed of two electrode layers with dielectric arranged therebetween. What applies as a rule of thumb is that the power or, respectively, the capacitance of the capacitor with multi-layer structure derives from the product of the capacitance of a single capacitor element and the plurality of capacitor elements.

DE 198 04 584 C2 discloses a double layer capacitor having at least two series-connected, individual cells. It comprises an alternating arrangement of electrode layers and the electrolyte layers and is manufactured by stacking up and pressing the individual layers. JP 11-260673 A discloses a double layer capacitor for whose-manufacture positive and negative electrodes are embedded in alternation in a band-shaped separator that is subsequently folded meander-like, so that a stack with alternating arrangement of positive and negative electrodes is obtained.

Another advantage of a multi-layer structure is comprised therein that the field strength between two electrode layers increases with decreasing electrode spacing. This enhanced field strength is also of interest for other components, for example for a piczo-actuator in multi-layer structure wherein the individual piezo-actuator elements are arranged above one another. Such a piezo-actuator having multi-layer structure can be operated with a far lower operating voltage then a correspondingly single-layer piezo-actuator having the same layer thickness of piezo-material or, respectively, having the same maximum piezo-electrically induced excursion.

Dependent on the function and application, components have a multi-layer structure can be implemented or, respectively, manufactured as a more or less loose stacking of individual layers above one another. Particularly given mechanical stressing, however, a firmer union of the individual layers is required in the multi-layer structure in order to lend the whole an adequate mechanical stability. A monolithic union is desired for components having ceramic multi-structure.

Given multi-layer capacitors, particularly with liquid electrolyte, the electrode layers are arranged in alternation above one another with intermediate layers that are not electrically conductive. In particular, a separator folder meander-like is thereby employed for the intermediate layer, the electrode layers being inserted into the "pockets" thereof. The electrode layers can there by also comprise a multi-layer structure; in said multi-layer capacitor, for example, they can comprise a three-layer structure composed of two porous carbon layers with intervening, metallic electrode layer, for example of aluminum. For manufacture, the different electrode layers are individually stacked on top of one another. A separate work step is thereby required for each layer or, respectively, each ply. When stacking such individual elements or, respectively, individual layers, problems then arise regarding the exact positioning of the layers, these, on the one hand, deteriorating the reproducibility and, on the other hand, leading to faulty components or components with reduced power. Particularly given layers that become thinner and thinner, the manipulation of the individual layers is also made more difficult since these layers are becoming increasingly more flexible and less mechanical stable at the same time.

It is therefore an object of the present invention to specify a method for manufacturing regular multi-layer structures suitable for, in particular, components that is simplified with respect to the implementation and dependably and exactly leads to the desired result.

This object is achieved with a method according to claim 1. Advantageous developments of the method as well as an apparatus for the manufacture of a multi-layer structure can be derived from the further claims.

The present invention is based on the basic idea of designing the manufacture of multi-layered structures as a continuous process since the repeating layer sequences in the multi-layer structure also produce repeating method steps. The most mechanically stable layer forms the base, this serving as a carrier material and being present in a band-shaped material, particularly as an "endless band".

The parting of the band-shaped carrier material into individual sections having the desired size and shape thereby ensues in at least two steps. In a first, partial separation step, the carrier material is divided into the individual carrier sections, whereby a connection that is capable of bearing remains between two respective individual, neighboring sections, the connection being fashioned, for example, web-like. As a result thereof, the continuous further processing of the carrier material at the section is possible. In the next step, the continuous application of at least one further material layer on one of the surfaces of the band-shaped carrier material ensues. Only after this step are the individual sections having the desired size separated completely from one another along a predetermined parting line, whereby the parting line lies above the partial separation that has already ensued.

The identical multi-layer sections that are thereby obtained are now joined to form the multi-layer structure by being regularly stacked on top of one another. As warranted, an intervening layer that can likewise comprise a multi-layer structure can thereby be respectively inserted between two multi-layer sections.

The method has the advantage that it can be continuously implemented, and that the smallest sections to be processed are already multi-layer sections that need not be individually stacked on top of one another. The multi-layer sections have the advantage that, due to the integrated process management, they comprise a uniform and exact structure. The problem of exact positioning has thus been solved within an individual multi-layer section. Deriving as a further advantage of the parting ensuing in two steps is that the basic areas of the individual layers, i.e. the basic area of the carrier sections and of the at least one further material layer, can be differently selected. It is thus possible to embed one material layer, particularly the carrier material, nearly completely between the other material layers. The cut edge of the carrier material then remains visible from the outside in the finished component only in the region of the most recently parted webs. This is advantageous particularly given metallic carrier materials that can form sharp cut edges, these in turn potentially representing a disturbing factor in the further-processing or in the manipulation of the component.

It is also possible with the method to apply not only one material layer on the carrier substrate but to apply further layers on the same surface or on the opposite surface simultaneously or following thereupon. It is also possible to set a different size of the sections by means of further, additional cuts for each individual material layer in order, in particular, to nearly completely embed internally disposed layers in the multi-layer section without a cut edge being visible from the outside. Only that part of the edge of the carrier material or of some other inwardly disposed layer that is parted in the last parting step as part of the bearing connection is then still visible.

Particularly given multi-layer sections having more then three individual layers, it is also possible to implement the parting in three steps, whereby the bearing connection remaining in the first partial separation is parted in a second partial separation after application of a further material layer, whereby, however, a part of the second material layer should remain as a remaining connection between two neighboring sections. In this case, the three parting lines can be placed such that a cut edge of the carrier material layer is no longer visible from the outside in the multi-layer section.

Different section sizes in the individual material layers can only be achieved when the partial separation in individual sections does not exclusively follow the parting line between two neighboring sections. On the contrary, it is necessary in this case that a broad parting line be placed in the partial separation between two respective neighboring sections or—better—that a parting strip to be punched out or removed in some other way. When the subsequent, further partial separation or the complete parting into individual multi-layer sections subsequently ensues with a smaller cutting width or even as a sharp separation along a parting line, then the area difference of the individual sections can maximally correspond to the area of a parting strip.

In an advantageous development of the invention, it is already achieved in two-layer multi-layer sections that the externally visible cut edge of a material layer is displaced inwardly with a smaller section area compared to other layers and is thus less disturbing. This is achieved when the parting line in the complete separation forms a recess pointing toward the middle of the section in the region of the bearing connection. In order for this to be the case given two neighboring sections, the web for this purpose is preferably parted by punching, for example a circular cutout.

This is of interest particularly for the multi-layer structure, whereby the cut edge is then situated in a recess that is set back retreats from the limiting surface of the multi-layer structure.

The invention is explained in greater detail below on the basis of an exemplary embodiment and the five figures belonging thereto.

FIG. 3 shows an individual multi-layer section in a schematic cross-section;

FIG. 4 shows a capacitor with multi-layer structure in a schematic cross-section; and FIG. 5 shows an apparatus for manufacturing a multi-layer section in a schematic cross-section.

Figure 1:
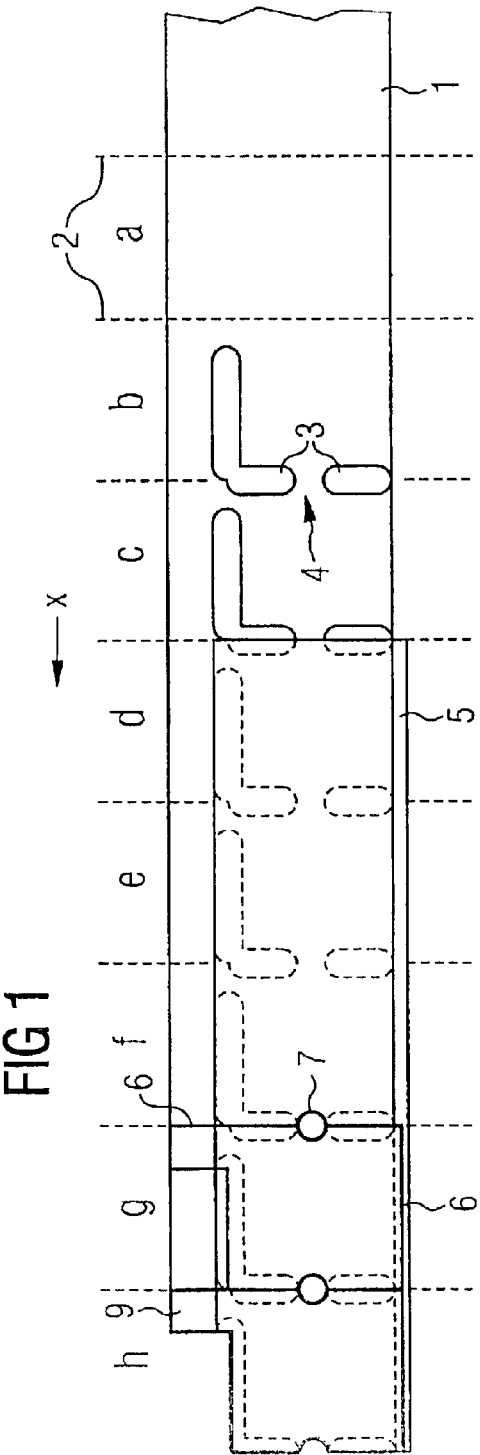
FIG. 1 shows a schematic illustration of band-shaped carrier material during various work steps.

With reference to the figures, the manufacture of multi-layer sections serving as electrodes for capacitors having multi-layer structure is described below as an exemplary embodiment. The base is formed of basis forms a band-shaped carrier material 1 particularly an electrically conductive foil, for example an aluminum foil. FIG. 1 shows the carrier material 1 excerpted with various sections in different processing stages. The envisioned boundaries between different sections a through h are identified with the broken lines 2.

A partial separation of the carrier material 1 into individual carrier material sections (for example b and c) is undertaken as first processing step. To that end, various recesses 3 are cutout from the carrier material 1 with the assistance of a suitable cutter or punching device. A connection in the form of a web 4 capable of bearing remains between the two partially separated sections c and d, said web 4 assuring the further-processing of the foil 1 as "endless material". In the illustrated embodiment, a through connection between the sections a through f is also obtained above the punched out areas 3, no separation into sections having ensued thereat.

Beginning from section d, a further material layer is applied onto the carrier material, the further material layer being a carbon cloth 5 in the present case for the capacitor application. This further material layer can be applied surface-wide, but for the capacitor application the further material layer is applied such that the upper edge strip in the Figure remains uncovered. Advantageously, the carbon cloth is also applied such that it has a narrow strip projecting beyond the edge of the carrier material 1 that is shown at the bottom in FIG. 1; either simultaneously therewith or at a different time, a further material layer can be applied onto the underside of the carrier material 1 in a corresponding way, the further material layer being a further carbon cloth here for the capacitor (this not being shown in the Figure for the sake of clarity).

Following as a next processing step is the complete separation of carrier material 1 and material layers 5 applied thereon. Using a suitable cutter or punching device, individual multi-layer sections 8 are cut off at what is the left end of the band-shaped carrier material in the Figure, being cut off along a parting line shown as a bold face line 6 in FIG. 1. Here, the parting line 6 is conducted centered over the recesses 3 of the first, partial parting. In the illustrated embodiment, a circular opening 7 is punched out in the region of the webs 4. The parting line is conducted from the edge strips of the carrier material 1 uncovered by the carbon cloth at the top in the Figure such that a tab 9 composed of uncovered carrier material is conducted out of the multi-layer section 8.

Figure 2:
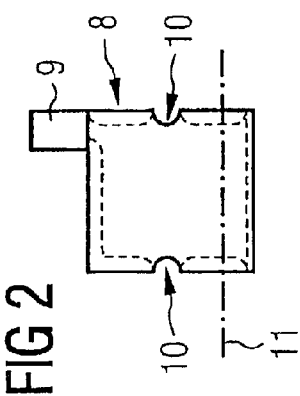
FIG. 2 shows an individual multi-layer section in a plan view.

An individual multi-layer section 8 that is shown by way of example in FIG. 2 is obtained as a result. The carbon cloth 5 overlaps the section of the carrier material 1 at all sides and, as viewed from above, only shares the cut edge in the region of the circular punch 10 with this. Only the tab 9, which serves for contacting in the later employment of the multi-layer section as an electrode unit in a capacitor having multi-layer structure, still projects from the multi-layer section 8 covered with carbon cloth 5 as a part of the carrier material 1.

Dependent on the application of the additional material layer, the multi-layer section 8 has only a lose connection between the individual layers. In the present exemplary embodiment, the connection between the carbon cloth 5 and the aluminum foil 1 serving as the carrier material is generated only by the pressing power of conveyor rollers. Preferably, the detached multi-layer sections 8 are therefore immediately further-processed.

For manufacturing a capacitor with a multi-layer structure, the multi-layer sections 8 are stacked on top of one another for this purpose, whereby an electrically non-conductive material is arranged as a separator between respectively two multi-layer sections 8. Preferably, the separator material is likewise a band-shaped, electrically insulating foil that, however, is transmissive for ions and that is folded meander-like, i.e. fan folded. FIG. 4 shows how the pre-processed multi-layer sections 8 are introduced into the pockets of this separator foil 12 folded meander-like, whereby a regular multi-layer structure 13 arises. For a capacitor, up to 100 multi-layer sections having a separator 12 lying therebetween can be arranged stacked on one another. In order to enable a different polarization or, respectively, contacting in the finished capacitor, the individual multi-layer sections are preferably rotated by 180° in alternation, so that the tabs 9 which are composed of aluminum foil project from the multi-layer structure 13 at different sides.

For completion, the multi-layer structure 13 is introduced into a housing, the tabs are welded to one another and to the housing, and the housing is subsequently filled with a solvent and with a conductive salt. Possible dimensions for such a capacitor having multi-layer structure thereby extend from approximately 16×30×55 mm for a capacitor with approximately 100 F. up to dimensions of 60×60×160 mm for a capacitor having approximately 2700 F.

FIG. 5 shows a schematic illustration of an apparatus that is suitable for the manufacture of the multi-layer sections 8. This comprises a first feeder device for a bandshaped carrier material 1, for example composed of a supply reel 15 and at least one deflection and conveyor roller 19. With this, the band-shaped carrier material 1 is transported in a processing direction x. A partial separation of the band-shaped carrier material 1 into individual sections, for example by to the punches 3 in FIG. 1, ensues in a first punching device 18. The first punching device 18 is followed by an apparatus 5 for continuous application of at least one further material layer 5; for band-shaped, further material 5, for example, this is composed of at least one supply reel 17 and conveyor and deflection rollers 20 and 21. For the specific exemplary embodiment, FIG. 5 shows a possible, further feeder device for a band-shaped, third material layer 14 that here comprises a supply reel 16 and at least two further conveyor and deflection rollers.

The device for applying the at least one further layer is followed by a second punch device 22 that is fashioned for the complete parting of the material band that is composed here of three layers and was hitherto interconnected. In FIG. 5, this second punch device 22 is schematically fashioned as a cutter blade. Detached multi-layer sections 8 are thus obtained that can be employed for manufacturing a multi-layer structure 13 by being stacked on top of one another.

The manufacturer of a multi-layer structure that has been described only by way of example on the basis of an exemplary embodiment can also be varied in a simple way for other applications, whereby, in particular, the materials, the plurality of further layers and the shape of the sections or, respectively, the cut management for the partial and complete separation of the sections can be varied. Overall, the method is extremely well-suited for a fully automated process with which a reliable positioning of the individual layers relative to one another is assured at least in the multi-layer section. An involved handling of the individual layer sections is thereby no longer required.

What is claimed is:

1. A method for manufacturing a multi-layer structure having a repeating layer sequence, comprising the steps of:

providing a band-shaped carrier material;

partially separating said carrier material into individual carrier sections of a same respective size and shape and preserving bridge-like connections between said individual carrier sections, said individual carrier sections being interconnected by said bridge-like connections;

continuously applying at least one further material layer onto at least one surface of said carrier material;

completely separating said carrier material and said at least one further material layer along a parting line utilizing the partial separation that has already ensued, so as to obtain at least parts of multi-layer sections having the repeating layer sequence;

regularly stacking said multi-layer sections on top of one another to form said multi-layer structure; and performing said steps of partially separating and continuously applying and completely separating by a single apparatus on a continuously running band of said carrier material.

2. A method according to claim 1, wherein said step of partially separating said carrier material ensues such that said individual carrier sections have a smaller base area than said multi-layer sections.

3. A method according to claim 1, wherein said step of partially separating includes producing recesses by punching said band-shaped carrier material to form said bridge-like connections, and wherein said step of completely separating includes cutting through said at least one further material layer and said bridge-like connection between said individual carrier sections.

4. A method according to claim 3, wherein said parting line is placed in a region of said bridle-like between said individual carrier sections that a recess pointing to a middle of a respective one of said individual carrier sections arises in said multi-layer section.

5. A method according to claim 1, wherein said carrier material is a metal foil and said further material layer is a porous electrode layer, and further comprising the step of:

providing said multi-layer sections as electrodes so that said multi-layer component is an electrical multi-layer component.

6. A method according to claim 1, further comprising the step of:

inserting an intermediate layer between two respective ones of said multi-layer sections.

7. A method for manufacture of a multi-layer capacitor, comprising the steps of:

providing a band-shaped carrier material;

partially separating said carrier material into individual carrier sections of a same respective size and shape and preserving bridge-like connections between said individual carrier sections, said individual carrier sections being interconnected by said bridge-like connections;

continuously applying at least one further material layer onto at least one surface of said carrier material;

completely separating said carrier material and said at least one further material layer along a parting line utilizing the partial separation that has already ensued, so as to obtain at least parts of multi-layer sections having a repeating layer sequence;

regularly stacking said multi-layer sections on top of one another to form a multi-layer structure;

separating said multi-layer sections from one another by separator foils when stacked on top of one another to form a multi-layer capacitor and performing said steps of partially separating and continuously applying and completely separating by a single apparatus on a continuously running band of said carrier material.

8. An apparatus for continuous manufacture of multi-layer sections, comprising:

a serial arrangement of the following:
- a feeder device operable to feed a band-shaped carrier material;
- a first punching device operable to partially separate said carrier material into individual carrier sections, said first punching device preserving bridge-like connections between said individual carrier sections so that said individual carrier sections are interconnected by said bridge-like connections;
- an applicator operable to continuously apply at least a second material layer onto said carrier material; and
- a second punching device operable to completely separate said carrier material and said at least said second material layer into individual multi-layer sections;

said first and second punching devices and said applicator operating on a continuously running band of said carrier material.

9. An apparatus according to claim 8, wherein said second material layer is band-shaped, and wherein said applicator is a second feeder device for said second material layer.

10. An apparatus according to claim 8, wherein said firm feeder device includes a supply roll of said band-shaped carrier material.

11. An apparatus as claimed in claim 9, wherein said second feeder device includes supply roll of said band-shaped second material layer.

12. An apparatus according to claims 8, wherein said applicator is operable to apply a respective second material layer onto an upper side and an underside of said carrier material.

* * * * *